Oct. 20, 1953  J. P. FELLABAUM  2,656,196
TRAILER VEHICLE WITH DEMOUNTABLE WHEEL TRUCKS
Filed March 8, 1950  4 Sheets-Sheet 1
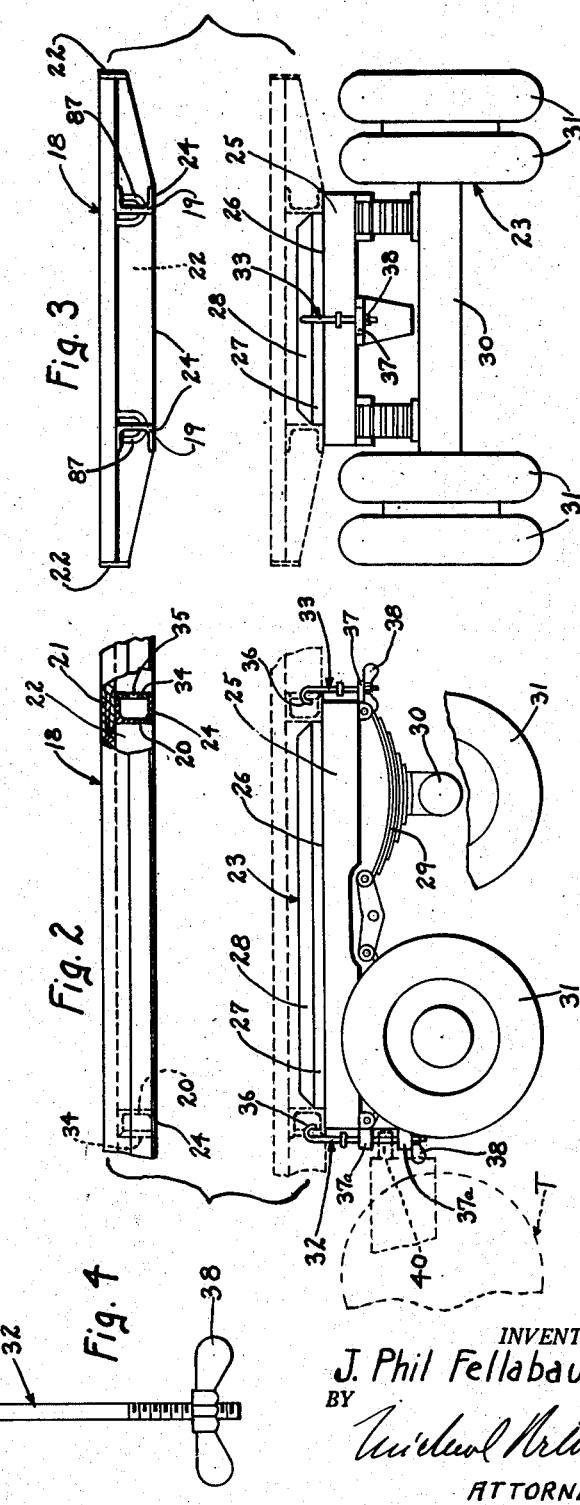
INVENTOR.
J. Phil Fellabaum
BY
ATTORNEY Oct. 20, 1953     J. P. FELLABAUM     2,656,196
TRAILER VEHICLE WITH DEMOUNTABLE WHEEL TRUCKS
Filed March 8, 1950     4 Sheets-Sheet 2
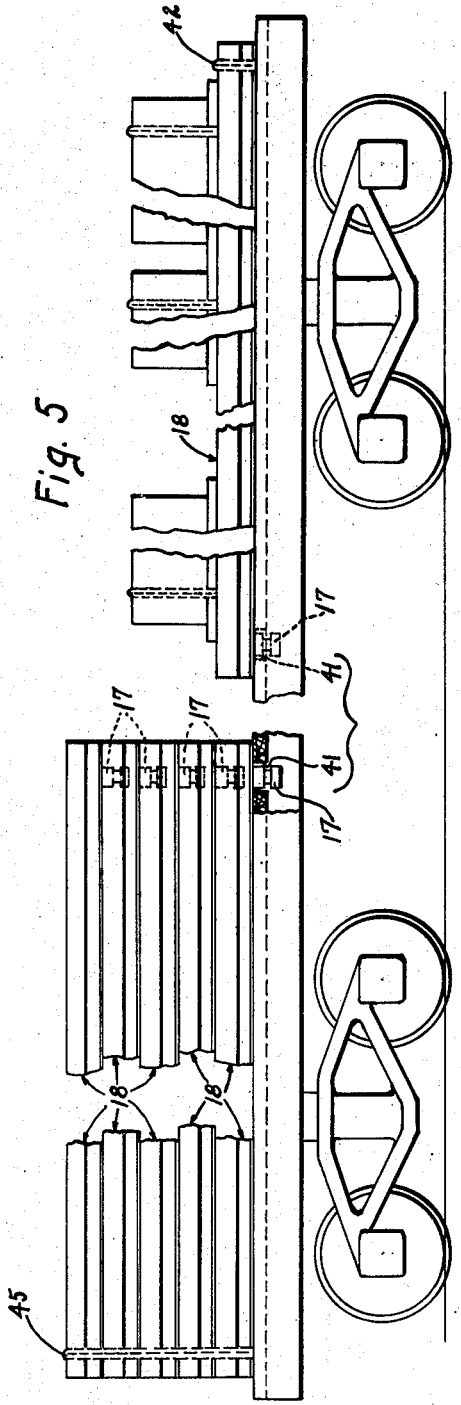
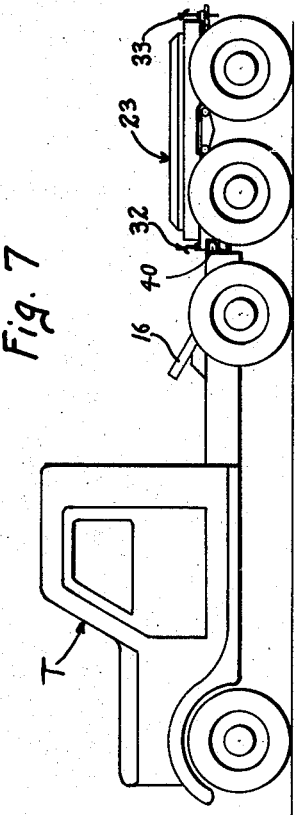
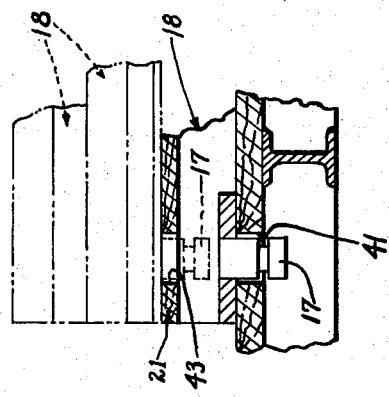
INVENTOR.
J. Phil Fellabaum
BY
ATTORNEY

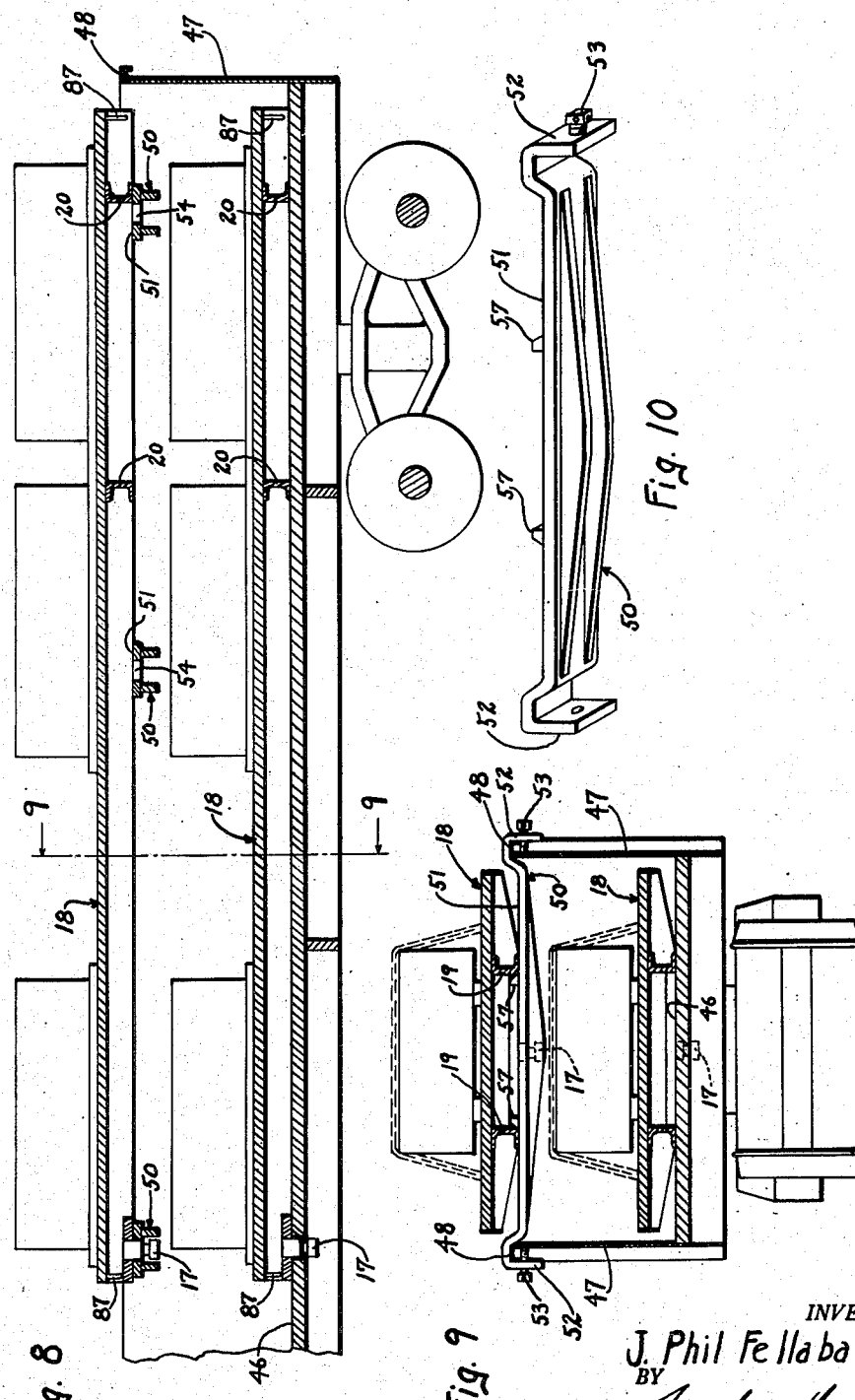

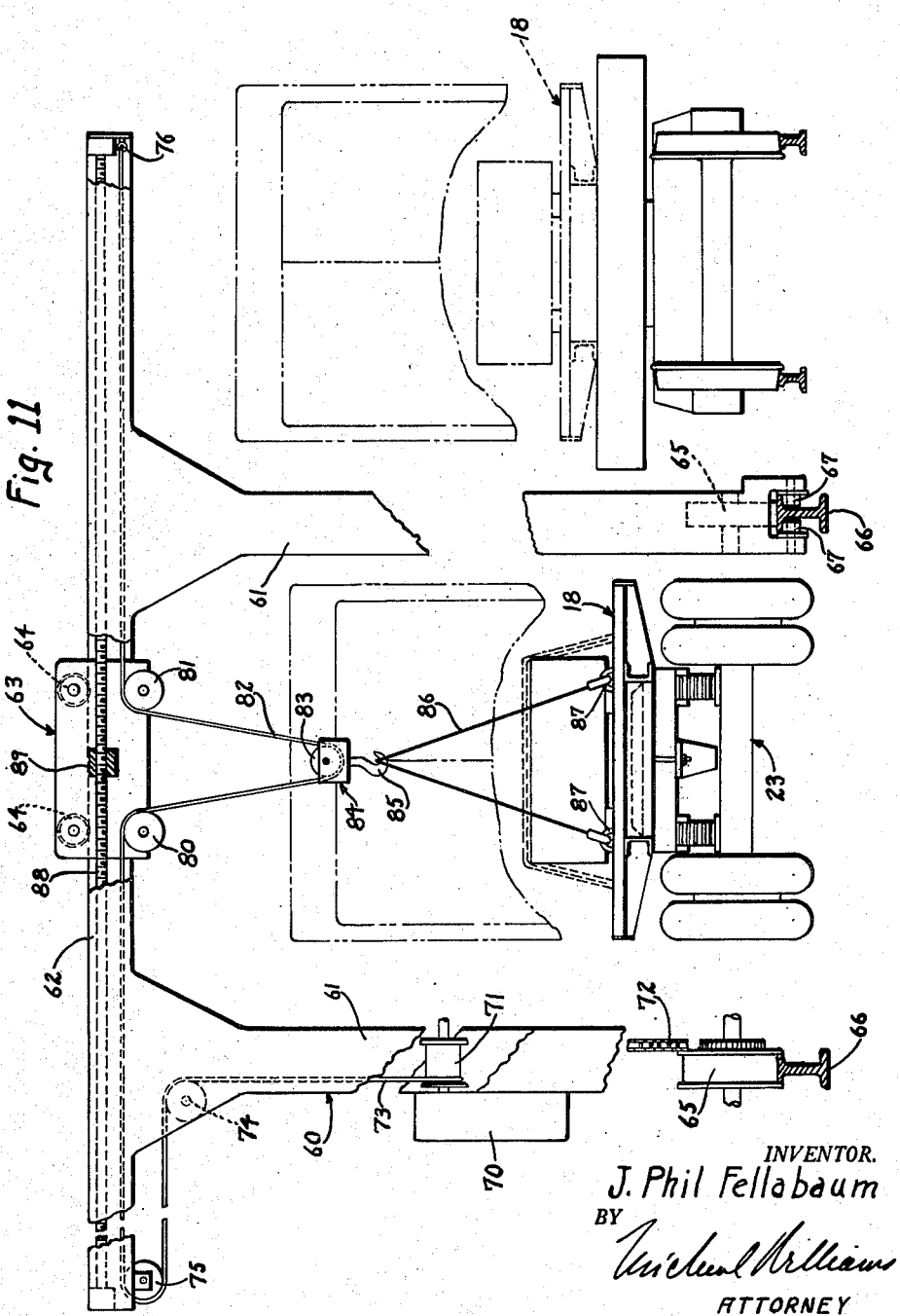

Patented Oct. 20, 1953

2,656,196

UNITED STATES PATENT OFFICE 2,656,196

TRAILER VEHICLE WITH DEMOUNTABLE
WHEEL TRUCKS

John Phil Fellabaum, Warren, Ohio

Application March 8, 1950, Serial No. 148,407

5 Claims. (Cl. 280—81)

My invention relates to methods and means for transporting goods, and the principal object of my invention is to produce new and improved methods and means of this character. In the following description, my invention is largely applied to truck and railroad cooperation, although it is to be understood that the invention is not limited to such particular combination, and that it includes cooperation with water and air transportation systems.

In freight transportation of today, the railroads and truckers are in constant competition with each other with the result that each suffers thereby since each invades fields which should logically be serviced by the other from an economic standpoint, and more important, the general public suffers by increased cost of goods necessitated by high cost of transportation. Also, in considering the super modern weapons of war, it will be obvious that industry must be de-centralized. Such de-centralization requires more flexible transportation means, and my invention ideally provides such flexibility.

In modern transportation, the railroads are best suited for long-distance hauls, especially between two points which act as central collecting points, so that two-way long-distance hauling is possible.

Truck transportation, on the other hand, is not economical from a long-distance hauling viewpoint, especially since two-way hauling is frequently unavailable. Thus, it is quite frequent that a truck delivers its load to a destination point and is then forced to "dead-head" home. The cost of travel to and from the destination point necessarily must be figured in the cost of transportation to the destination point alone, and it will be appreciated that this materially increases transportation costs.

Further, with more and more motor vehicles using the highways, traffic problems have materially increased. Many traffic problems are caused by the heavier and slower moving trucks, and much thought has been given to elimination of truck traffic from passenger car highways. However, any solution involved the building of additional highways at tremendous costs.

As at the present time, with trucks transporting goods interstate, and from coast to coast, it will be appreciated that an enormous investment is required to engage in long distance hauling. Also, control over equipment and operators which are spread over the States is difficult and sometimes non-existent, with the consequence that operators frequently disobey rules and regulations with respect to hours of travel and to condition of equipment.

My invention provides for complete cooperation between railroads and highway-truck operations, whereby truckers in a particular locality will be confined to delivering loads to and from a central receiving point, which point may be one of many distributed throughout the railroad system. At this point, suitable hoisting mechanism, as provided by my invention, will be available to make up a train, so that the common now-a-day practice of switch engines and switch yards will be largely eliminated. Further, through use of my invention, a truck operator need not be kept waiting for a trailer to be loaded or unloaded, nor will expensive equipment be tied up in such processes.

My invention also provides means whereby truck traffic will be largely eliminated from long-distance highway travel, and whereby truck loads may be readily loaded onto rail cars, or other transportation means, and thus transported for long distances. Also, my invention provides means whereby a plurality of empty trailer bottoms may be returned by railroad, or by a reduced number of trucks, thus eliminating the expense involved in "dead-heading."

It is understood that many attempts have been previously made to solve the problems hereinbefore discussed, but it is submitted that such attempts have lacked the practical approach to the problem and accordingly have failed.

In the drawings accompanying this specification, and forming a part of this application, there is shown, for purposes of illustration, an embodiment which my invention may assume, and in these drawings:

Figure 1 is a side elevational view of a tractor-trailer combination embodying my invention, Figure 2 is an enlarged, fragmentary side elevational view of portions shown in Figure 1, the trailer platform being shown, in full lines, in relation removed from the wheel unit, and being shown, in dotted lines, in relation on the wheel unit, Figure 3 is an enlarged end elevational view of the trailer shown in Figure 1, the trailer platform being shown, in full lines, in relation removed from the wheel unit, and being shown, in dotted lines, in relation on the wheel unit, Figure 4 is an enlarged view of a detail, Figure 5 is a broken side elevational view of a railway car illustrating a manner in which the load is carried, Figure 6 is an enlarged sectional view of a connection means, Figure 7 is a side elevational view illustrating a tractor towing a wheel unit, Figure 8 is a fragmentary longitudinal sectional view through another type of railway car, illustrating a method of carrying a load, Figure 9 is a transverse section corresponding generally to the line 9—9 of Figure 8, Figure 10 is an enlarged perspective view of a support used in carrying the load in the manner illustrated in Figures 8 and 9, and Figure 11 is a somewhat general view of a hoisting mechanism used in carrying out my invention.

Figure 1 illustrates a tractor T, which may be of any one of the standard designs, coupled to a trailer 15. The usual manner of coupling the tractor and trailer is by means of a fifth wheel 16, carried by the tractor, in cooperation with a coupling pin 17 carried by the forward end of the trailer.

The trailer 15 comprises a load carrying platform 18 which may be of the usual rectangular shape in plan view, and is preferably relatively flat, as shown, for a purpose hereinafter apparent.

The platform 18 may be formed by spaced-apart longitudinal stringers 19, such as steel channels, and a plurality of spaced-apart transverse channels 20 which are secured to the channels 19, as by welding, to provide the platform frame. A bottom 21 is suitably connected to the channels 19 and 20 for supporting a load. A steel band 22 may encompass the periphery of the bottom 21 for appearance and protection purposes.

Wheel means are provided for cooperation with the load carrying platform 18, such wheel means having ready connection and disconnection with the platform. In connected relation, the wheel means and platform provide a road-trailer unit which may be towed, in conventional manner, by a tractor T. In disconnected relation, the platform is still used as a pallet to support the load, such as for purposes later to be described, and the wheel means may be stored, towed away, or put to other use.

Referring particularly to Figures 2 and 3, two adjoining ones of the transverse channels 20, preferably adjacent to the rear of the platform, combine with adjoining portions of the longitudinal channels 19 to form a recess 22 which opens from the undersurface of the platform 18. As best seen in Figures 2 and 3, the channels defining the recess 22 have out-turned flanges to provide a ledge surface 24 for a purpose later to be described.

The wheel means is herein shown in the form of a self-supporting wheel unit 23 comprising a supporting frame 25 of suitable construction, such as a fabrication of structural steel shapes, the upper surface 26 of which forms a support upon which the ledge surface 24 may rest. Extending upwardly from the supporting surface 26 is a projecting portion 27 which may have its terminal portion 28 tapering inwardly. The projecting portion 27 fits within the recess 22 and the tapering terminal portion 28 assists in location of the interfitting parts. It will be evident that the wheel unit 23 provides a secure support for the platform 18, yet the platform 18 may be readily lifted therefrom. The frame 25 provides support for the springs 29 which are connected with axles 30 for carrying wheels 31, all in the usual manner.

It will be appreciated that the connection provided by the projection 27 interfitting with the recess 22 may be sufficient for certain purposes. However, to fully insure against unintentional disconnection of the platform 18 and the wheel unit 23, it is preferred to provide connection means which positively prevent unintentional disconnection of the platform 18 and wheel unit 23.

In the embodiment herein disclosed, only two connection devices have been found necessary, one device 32 being disposed at the front and the other 33 at the back of the supporting frame 25, each preferably at the midpoint of its respective transverse side of the frame 25. With particular reference to Figure 2, lugs 34 may be welded to span legs of the transverse channels 20, each lug being formed with an aperture 35 for receiving a hook extremity 36 of a connecting device. Each of the devices 32, 33 is in the form of a hook bolt, the shank of which freely fits through an aperture or apertures in lug means carried by the supporting frame 25. The device 32 passes through apertures in spaced-apart lugs 37a carried at the front of the frame, whereas the device 33 passes through an aperture in a lug 37 carried at the rear of the frame. A wing nut 38 is preferably threaded into the free end of each hook bolt, and these nuts may be threaded against connecting lugs to draw the hook extremities downwardly and prevent their displacement from respective apertures 35. Any suitable means may be provided to prevent complete removal of the wing nut 38 which cooperates with the device 33, such as by peening over the free end of the hook bolt, or by using cotter pins or lock nuts. A collar 39 may be welded to the shank of each hook bolt to prevent unintentional displacement of the bolt. As seen in Figure 4, the collar 39 also provides an abutment engageable with the lugs 37 and 37a so that the wing nut 38 may be drawn up to firmly hold the devices 32, 33 in place.

The connecting device 32 disposed at the front of the frame 25 differs slightly from the rear connecting device 33 in that its shank portion is longer so that it may extend through the spaced-apart connecting lugs 37a carried by the supporting frame 25. In the case of the connecting device 32, it is preferable that the wing nut 38 be removable from its hook-bolt, so that when the wheel unit 23 is disconnected from the load-carrying platform 18, the bolt may be freely disposed through an aperture in a lug 40 carried by a rear portion of the carriage of the tractor T. In this manner, the wheel unit 23 may be towed by the tractor T, as shown in Figures 2 and 7.

In view of the foregoing, it will be appreciated that any one of a plurality of similar load-carrying platforms 18 may be used in cooperation with any one of a plurality of similar wheel units 23. This desirable combination provides for numerous beneficial results, as will be apparent later.

Figure 5 illustrates a railway flat car which, in all respects, may be of standard design with the exception that apertures 41 are preferably formed in the bottom thereof for the purpose of receiving the fifth wheel pins 17 carried by each of the load-carrying platforms 18.

As before described, a platform 18 may be combined with a wheel unit 23 to form a road-trailer unit, such unit being movable as by means of the conventional tractor T. When a loaded unit is moved adjacent to a railway car, the connection devices 32 and 33 may be loosened so that the hooks 36 may be withdrawn from respective apertures 35. In this condition, the wheel unit 23 still supports the load-carrying platform. When the pin 17 has been removed from the fifth wheel 16 of the tractor T, the platform 18, acting as a pallet for carrying its load, may be lifted onto a railway car for transportation to a distant point.

The right end portion of Figure 5 shows a loaded platform 18 disposed on the bed of the railway car, the fifth wheel pin 17 being disposed through the recess 41 in such bed, thus assisting in holding the load against shifting. The opposite end of the platform 18 may be held against shifting about the pin 17 in any suitable manner, as by a chain 42, or by stakes and the like (not shown).

The left hand portion of Figure 5 shows a plurality of unloaded platforms 18 stacked one above the other. For this purpose, the bottom 21 of each platform 18 is formed with an aperture 43 (see Figure 6) for receiving the fifth wheel pin 17 of the next uppermost platform 18 so that all platforms are thus held against shifting. A chain 45, or any other means, may be secured around the end of the platforms opposite the pins 17, to prevent such platforms from shifting about the pins.

Thus, it will be appreciated that not only loaded platforms may be shipped by rail, but a plurality of unloaded platforms may be returned by rail, whereby a decided savings in cost may be effected, since "dead-heading" of a tractor-trailer unit is eliminated. On the other hand, it will be appreciated that a plurality of empty platforms may also be returned on a trailer unit formed by a platform and wheel unit, the empty platforms being stacked in the same manner as described in connection with railway car stacking.

In Figures 8 through 10, I have shown a plurality of platforms 18 loaded onto a gondola-type railway car. The usual gondola car has a flat bed or floor 46 and upright sides and ends 47 which are usually formed of sheet steel and suitably reenforced. In usual construction, the upper ends of sides and ends 47 are bent back in themselves to form a stiffening channel 48.

One or more loaded platforms 18 may be carried from the bed or floor 46, and such bed is formed with an aperture or apertures for receiving the fifth wheel pin 17 of the platform, as before. It may be unnecessary to provide any further support to keep the loaded platform from shifting. In any event, it is a simple matter to block that end of the platform remote from the pin 17, to prevent it from shifting.

In Figures 8 through 10 provision is made for carrying two loaded platforms 18 one above the other without damage to either platform or to the load carried thereby. As shown, a plurality of straddle plates 50 are provided, each having a load-bearing surface 51, opposite ends of which terminate in hooks 52 which are adapted to hook over the side stiffening channels 48, as clearly shown in Figure 9. Screw bolts 53 may be threaded through the outer flange of each hook 53, the bolts engaging under an adjoining portion of the stiffening channel 48 to prevent displacement of the respective straddle plate 50.

Each of the straddle plates 50 is formed with an aperture 54 for passing the fifth wheel pin 17 of the platform carried thereby. In Figure 8, three straddle plates are shown for supporting a single platform and although only one of the plates 50 has engagement with the fifth wheel pin, all plates are provided with an aperture 54 so that the plates may be used interchangeably. Extending upwardly from the bearing surface 51 of each straddle plate 50 is a pair of spaced lugs 57 adapted to fit against respective longitudinal channels 19 of the platform 18. The lugs 57 not only assist in preventing shifting of the platform, but also provide means whereby proper disposition of the platform with respect to the respective straddle plate is effected. If desired, suitable chains, or other means (not shown), may be used to hold the upper platform 18 from being unintentionally removed from the straddle plates 50 or from the gondola car. It will be appreciated that a stack of empty platforms may be carried by the gondola car in the manner as hereinbefore described.

In Figure 11, I have shown a hoist mechanism which may be used as a part of the transportation system herein disclosed. The hoist mechanism, as here shown, comprises a pair of frames 60, only one of which is herein shown. It will be appreciated that a similar frame will be spaced from the one shown to provide hoisting mechanism suitable for engagement with the respective ends of a platform 18. Further, it will be appreciated that the frame which is not shown will have parts similar to the one shown, such parts operating cooperatively to provide effective hoisting mechanism. Each frame 60 comprises a pair of upright leg members 61 spaced-apart a distance greater than the overall width of a tractor-trailer combination. A cross beam 62 straddles each pair of legs 61, each beam 62 providing tracks for a carriage 63. The carriages on respective beams 62 are preferably tied together for movement in unison, each carriage having track wheels 64 engageable with its respective beam tracks.

Each of the upright leg members 61 has a wheel 65 at its lower end, the wheels being operable along spaced-apart tracks 66 which are disposed along-side a section of the railway track and preferably in parallelism therewith. As seen in Figure 11, the left hand wheel 65, which is the drive wheel, is flanged to hold the wheel in proper driving relation without binding. The right hand leg 61 has small rollers 67 which engage under flanges of the adjoining track 66 to prevent the hoist mechanism from tipping when a load is moved toward the ends of the beam 62. Each of the beams 62 is of sufficient length so that a load may be taken from a trailer unit disposed between the legs 61 and moved to position either on a railway car to the right of the hoist mechanism or moved to a storage area to the left of the hoist mechanism, the directions being with respect to disposition of parts shown in Figure 11.

Since the hoisting mechanism may be used in areas where use of electrically operated motive power is not practical, or where electric power is not available, the hoisting mechanism has been designed to use motive power other than electric power, although this is not to be understood as a limitation.

For purposes of illustration, I may use an internal combustion engine 70 and may support such engine on any suitable part of the hoisting mechanism, such as on one of the legs 61. The engine 70 is in driving relation, through a clutch and suitable transmission (not shown), with a cable drum 71 and may also, through suitable clutch arrangement (not shown) and chain 72, selectively drive at least one of the wheels 65 for the purpose of moving the hoist mechanism along the rails 66.

A flexible cable 73 is wound upon the drum 71, the cable extending upwardly and over a pulley 74 at the upper end of the respective leg 61, and then extending laterally and over a pulley 75 at the left hand end of the beam 62. The cable leaves the pulley 75 and extends the full length of the beam 62 and has its free end anchored to the right hand portion of the beam, as at 76. It will be appreciated that a similar cable will be similarly arranged with the frame not shown, such cable being wound on a drum which is rotatable in unison with the drum 71.

An intermediate part of the cable extends over pulleys 80, 81 which are supported on the carriage 63 in spaced-apart relation, the part of the cable between the pulleys 80, 81 extending downwardly to form a loop 82 which runs over a pulley 83 forming part of a pulley block 84. A hook 85 may be carried by the pulley block 84, such hook being adapted to be connected to a lifting sling 86. The ends of the sling 86 are adapted for connection with rings 87 carried at opposite ends of the platform 18, whereby the platform may be lifted from the wheel unit 23.

In operation, when the drum 71 is being rotated to wind the cable 73 thereon, the loop 82 will be gradually shortened and the loaded platform will be lifted. Any suitable means may be used to shift the carriages 63 along their tracks, and as here disclosed such means comprises a screw 88 rotatable in bearings carried by the respective beam 62, rotation being effected by means of gearing (not shown) which is connected to the engine 70. Each carriage is provided with a nut 89 having driving engagement with its respective screw. It will be appreciated that if the carriage is moved along its tracks, and the cable 73 is not being wound on or unwound from the drum 71, no change in size of the loop 82 will be effected.

The foregoing apparatus provides extreme flexibility in road and rail transportation facilities, and also provides for economical cooperation between railroad and trucking operations. As an example of optimum cooperation, certain centrally located rail yards may be designated as freight collecting and shipping points for predetermined localities. At each of such points a hoist mechanism such as herein described may be positioned adjacent to a section of a railway track, such section preferably being a spur section connected to the main line, and a plurality of railway cars may be disposed on such track section.

The truckers are therefore confined in their travel to a local area serving the railway receiving point, and such truckers pick up freight from various manufacturing and other shipping sources and deliver it to the receiving point. As the loaded trailer units reach the receiving point, such units may be lined up along the track section and between the tracks 66 of the hoist mechanism.

The operator of the hoist mechanism, who may be a freight dispatcher, or who may work in cooperation with a freight dispatcher will then determine which of the loaded platforms are to be loaded on predetermined railway cars. The order of alignment of the trailer units is of no great importance since any loaded platform may be hoisted from its wheel unit and may be moved by the hoist mechanism along the hoist tracks to alignment with a proper railway car.

As an example, with a trailer unit in position shown in Figure 11, the operator of such unit loosens the connecting devices 32, 33 so that the platform 18 is connected solely by the frame 25 of the wheel unit. The operator may then release the fifth wheel connection and the platform is in condition to be lifted.

At the proper time, the operator of the hoist mechanism may align the hoist with the platform to be loaded and secure slings 86 to the rings 87 disposed at the front and rear of the platform. The hoist mechanism is then operated to raise the platform from the wheel unit, and the carriages 63 are operated to move along the beams 62 to dispose the loaded platform over the adjacent railway car, whereupon the platform is lowered onto the car. However, if the lifted platform is not adjacent to the proper railway car, it may be moved, by movement of the hoisting mechanism along track 66, to alignment with a proper car. This eliminates all switching operations now required to make up a train, since the hoisting mechanism may be shifted to properly distribute the freight on proper cars in accordance with predetermined shipping instructions. The train so made up may be connected to an engine and moved to the main tracks for transportation to a destination point. The wheel units 23 remaining after the loading operation may be stored at the freight yard, or may be attached to the tractor and towed to the trucker's yard, or towed to a point for cooperation with another platform which is to be moved.

The railway destination point will also preferably have a hoisting mechanism such as herein disclosed and the incoming train will be shunted to a spur track alongside the hoisting mechanism track. Wheel units 23 will be available at this destination point for cooperation with such platforms which are to be immediately dispatched for delivery. As a platform is removed from the railway car, it is shifted to position between the legs 61 of the hoisting mechanism 60 and is disposed on a wheel unit 23 and supported thereon and on the fifth wheel of a tractor T. The trucker then engages the connecting devices 32, 33 and engages the fifth wheel with the pin 17, and a road trailer unit is immediately available for movement to a delivery point.

In some cases where insufficient wheel units 23 are available, or in cases where the loaded, incoming platforms are to be stored, either for delivery instructions or for switching to another train, the platforms may be removed from the train and the carriages 63 may be caused to travel to the left hand side of the beams 62, with respect to Figure 11. The platforms may then be lowered and stored or stacked in an area to the left of the hoist mechanism tracks 66. Further, in the event a plurality of empty platforms 18 are returned, such platforms may also be stored to the left of the hoist tracks 66 until such time as they are needed.

Thus, it will be appreciated that the platforms provide a pallet support for a load and are transmitted with the load. The empty platforms may be loaded at the convenience of the shipper, and if the shipper has suitable hoist mechanism a wheel unit need not be tied up with the platform, since the platform may be loaded and then positioned on a wheel unit by hoisting mechanism of the shipper. Further, it is not necessary to tie up a tractor during loading operations at a shipper's plant, assuming the shipper has no hoist mechanism, since the front end of the platform may be blocked so that the block and the wheel unit support the load. In some cases it may be desirable to provide the usual retractable landing gear at the front end of the trailer, but in such cases the landing gear should be so designed that it will not interfere with stacking relation of the platforms.

It will be appreciated that since the load is not removed from the platform until the ultimate destination point is reached, considerable handling is saved. Further, since the platform at all times forms a support for the load, and is easily and readily combined with a wheel unit to form a road-trailer unit, considerable time and expense are saved. Although this description has been largely confined to a relatively flat, load-carrying platform, it will be appreciated that sides and ends may be attached to the platform (as suggested in dotted lines in Figure 11) to provide a van-type body incorporating all the features hereinbefore pointed out, with the exception that such van-type bodies may not be efficiently stacked if they are too high. Further, the invention need not be limited to platforms or van-type bodies, since a hopper-type body, or any other suitable body, may be provided with detachable wheel means so that such body may be removed from the wheel means and transported by a railway car.

It will be appreciated that my invention combines the most efficient phases of two or more modes of transportation. With respect to railroad transportation, the least costly phase is the line-haul. Yard trackage, along with the inefficiency of spotting cars on railroad sidings, and with making up of a train of cars for various destinations, is very costly, and it is commonly known that these operations sometimes represent the difference between profit and loss to a railroad.

On the other hand, in motor transportation, the most costly phase of operation is in the line-haul. Because of the flexibility of highway transportation equipment, the pick-up and delivery operation is not the major cost, since such major cost is usually reflected in line-haul moving which requires the use of manpower for each single vehicle, plus the operating cost of each vehicle, including gasoline, tires, maintenance, and the like. Further, in line-haul motor transportation, the lack of maintenance and repair facilities at the point of mechanical or tire failure makes for many extra costs.

To provide further flexibility, a platform 18, with a wheel unit 23 connected thereto, may be formed into a full trailer by the connection of a wheel-dolly unit having a fifth wheel plate connectible to the pin 17. Thus, the trailer so formed will be supported by its own wheels without any attached power unit, and such trailer may be connected to a truck, or to a trailer-tractor unit such as shown in Figure 1, by means of a suitable towing bar.

In view of the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A trailer construction, comprising a trailer bed for carrying a load, and a plurality of interchangeable stable multiple-wheel units each having a bed supporting surface, any wheel unit and said trailer bed having complementary cooperable parts adapted to nest vertically in relation one surrounding the other to transmit driving thrust in all generally horizontal directions between said wheel unit and said trailer bed and to provide for selective engaged nesting relation and disengaged separated relation by vertical relative movement between said trailer bed and said wheel unit.

2. A trailer construction, comprising a trailer bed for carrying a load and having a portion forming a recessed area opening from the under side thereof, and a plurality of interchangeable stable multiple-wheel units each having a bed supporting surface and each including a portion having a configuration complementary to and adapted to nest vertically in surrounded relation within the recessed area opening of said trailer bed, said wheel unit portion being movable to engaged nesting relation and to disengaged separated relation with respect to said opening by vertical relative movement between said trailer bed and said wheel unit.

3. A trailer construction, comprising a trailer bed having a load supporting surface and longitudinal and transverse members disposed generally parallel to the plane of the load supporting surface and defining a box-like frame portion extending in a downwardly direction from said supporting surface, and a plurality of interchangeable stable multiple-wheel units each having a bed supporting surface engaging with an under surface of said box-like frame portion, each wheel unit also having a projecting portion complementary to and engaging vertically within said box-like frame portion and in close cooperating horizontal relation, said box-like frame portion being movable to and from engaged relation with said projecting portion by vertical relative movement between said trailer bed and said wheel unit.

4. A trailer construction comprising a trailer having a bed member for carrying a load, and a plurality of interchangeable and stable multiple-wheel members for supporting said bed member, one of said members having a walled recess therein of substantial area and the other of said members having a projection thereon having an overall configuration conforming to and adapted to closely nest within said walled recess, to transmit driving thrust between said members in universal substantially horizontal directions, said projection having an inwardly tapered side wall surface portion to facilitate insertion of said projection into said recess by a relative vertical movement of said trailer bed and wheel members in one direction, relative vertical movement of said members in the opposite direction serving to separate said trailer from said wheel member, and means for removably locking said projection against displacement from said recess to maintain driving relation between said wheel member and trailer under all driving conditions.

5. A semi-trailer construction comprising a trailer bed having a vertically extending recess at one end of its upper surface, a king pin at the forward end of said bed and extending downwardly from its lower surface for detachable connection with the fifth wheel of a tractor unit, and a detachable wheel unit at the rear end of said bed, said trailer bed when detached from said tractor unit and from said wheel unit forming a load carrying pallet with said king pin adapted to be received within the recess of a similar juxtaposed pallet and selectively within a corresponding recess in the surface of a pallet transporting vehicle.

JOHN PHIL FELLABAUM.

References Cited in the file of this patent

UNITED STATES PATENTS

| Number | Name | Date |
|---|---|---|
| 1,197,354 | Dickinson | Sept. 5, 1916 |
| 1,288,432 | Long | Dec. 17, 1918 |
| 1,296,756 | Buckley | Mar. 11, 1919 |
| 1,751,717 | Romine | Mar. 25, 1930 |
| 1,863,348 | Nabors | June 14, 1932 |
| 1,968,196 | Francis | July 31, 1934 |
| 1,996,695 | Bigley, Jr. | Apr. 2, 1935 |
| 2,050,471 | Soulis | Aug. 11, 1936 |
| 2,114,707 | Fitch et al. | Apr. 19, 1938 |
| 2,121,181 | Bayerl | June 21, 1938 |
| 2,192,575 | Hewitt | Mar. 5, 1940 |
| 2,544,657 | Cushman | Mar. 13, 1951 |
| 2,590,962 | Gurton et al. | Apr. 1, 1952 |

OTHER REFERENCES

Motor Age, March 1949, page 135.